United States Patent [19]

Magda

[11] Patent Number: 4,901,655
[45] Date of Patent: Feb. 20, 1990

[54] CULTIVATOR

[75] Inventor: Robert J. Magda, Morganville, N.J.

[73] Assignee: Lawn Doctor, Inc., Matawan, N.J.

[21] Appl. No.: 131,988

[22] Filed: Dec. 11, 1987

[51] Int. Cl.⁴ .................... A01C 7/00; A01B 33/00
[52] U.S. Cl. ........................... 111/8; 111/133; 172/95; 172/97
[58] Field of Search ............ 111/1, 8, 10, 11; 172/21, 42, 43, 84, 91, 92, 93, 95, 96, 97, 82, 256, 361, 366, 365, 794

[56] References Cited

U.S. PATENT DOCUMENTS

| | | | |
|---|---|---|---|
| 964,490 | 7/1910 | Cartwright | 172/42 |
| 1,099,707 | 6/1914 | Love | 172/42 |
| 2,056,337 | 10/1936 | Archibald | |
| 2,183,618 | 12/1939 | Magruder | 74/21 |
| 2,206,264 | 7/1940 | Rose | 172/63 |
| 2,476,918 | 7/1949 | Scheerer et al. | 172/21 |
| 2,688,907 | 9/1954 | Joy | 172/42 |
| 2,873,807 | 2/1959 | Yager | 74/21 |
| 2,966,218 | 12/1960 | Johnson | 111/11 |
| 3,057,412 | 10/1962 | Hovis, Jr. | 172/96 |
| 3,140,677 | 7/1964 | Fraser | 111/8 |
| 3,264,890 | 8/1966 | Erban | 111/8 |
| 3,414,063 | 12/1968 | Kuhlman | 172/21 |
| 3,685,468 | 8/1972 | Paige et al. | 111/11 |
| 3,777,460 | 12/1973 | Mokros | 172/42 X |
| 3,878,899 | 4/1975 | Jones | 172/21 |
| 3,926,131 | 12/1975 | Collins | 172/42 |
| 4,096,915 | 6/1978 | Groth | 172/42 |
| 4,152,993 | 5/1979 | van der Lely et al. | 111/73 |
| 4,167,976 | 9/1979 | Van der lely | 172/68 |
| 4,171,021 | 10/1979 | Van der lely | 172/63 |
| 4,524,642 | 6/1985 | Fritsch | 74/796 |
| 4,658,909 | 4/1987 | McDermott et al. | 172/95 |

Primary Examiner—Brian S. Steinberger
Attorney, Agent, or Firm—Mark I. Feldman

[57] ABSTRACT

A special cultivating machine, lawn care apparatus and process are provided to properly prepare, efficiently condition, and gently cultivate the soil, turf and lawn in a uniform manner without uprooting, ruining, or damaging existing healthy plants and grass and without substantial thatching. The special cultivating machine, lawn care apparatus and process attain excellent seed and soil contact for virtually all soil compositions, textures, and conditions, and accurately follow the contour of the ground soil, turf, or lawn, regardless of mounds, hills, valleys, irregularities, clumps, and other soil conditions. The cultivating machine and lawn care apparatus has spring biased, rearwardly facing, scratching arms (cultivation fingers) which are reciprocatingly driven by a crankshaft. The crankshaft is smoothly rotated by a chain and sprocket arrangement. Desirably, the crankshaft and scratching arms can be raised or lowered by a height adjustment assembly to vary the depth and angle of soil penetration.

12 Claims, 3 Drawing Sheets

CULTIVATOR

BACKGROUND OF THE INVENTION

This invention relates to lawn and soil treatment and, more particularly, to a cultivating machine and process.

There are many problems in lawn preparation and conditioning. The presence of dead grass, clippings, and weeds often interferes with the growth of new grass or may smother the grass completely. Grass plants can become uprooted, torn, or otherwise damaged. Soil can become packed and harden in areas in which there is relatively little moisture from rainfall during extended portions of the year, making it difficult to successfully plant and germinate grass seeds.

In the preparation and conditioning of seed beds and the maintenance of attractive lawns, it is desirably to scratch, gently disturb, and cultivate the soil, lawn, or turf about the ground and around grass roots to receive air, water, fertilizer, and other materials for the stimulation of grass growth.

Hand rakes, hand cultivators, hoes, and other manual devices have been used for lawn preparation and conditioning, but they can be very tedious, strenuous, and time consuming. Furthermore, hand rakes, hand cultivators, hoes, and other manual devices, are very inefficient and require much labor for large lawns and acreage.

Power cultivating, tilling, plowing, and raking machines on the other hand, can also be useful, but they are generally large and heavy, difficult to maneuver and operate, and usually inefficient and complicated. Often, many conventional power cultivating, tilling, plowing, and raking machines uproot, mangle, destroy or otherwise damage existing plants and grass and excessively disturb, disrupt, clump, channel, mar, tear, and gouge the lawn and turf. Undesirably, many conventional power cultivating, tilling, plowing, and raking machines also create enormous amounts of thatch (dead root matter) which need to be collected and removed or else the new and healthy grass may smother and die.

Attractive lawns are desired and appreciated by owners, tenants, employees, customers, local residents, visitors, and others in many areas, such as in industrial parks, company headquarters, professional buildings, other office buildings, factories, city hall, homes, fire stations, municipal parks, schools, athletic fields, etc.

In the past, the planting and maintenance of a lawn has customarily been accomplished by a series of individual operations. These separate operations normally involve cultivation preparation of the ground for seed, fertilization, and watering. When properly planted, grass seeds will germinate in the soil to produce an attractive lawn. Once the lawn begins to grow it usually is necessary to maintain the lawn same by the application of additional grass seeds and, if necessary, fertilizers, pesticides, herbicides, fungicides, etc. Sometimes it is also desirable to periodically aerate the lawn. Most of these steps are usually accomplished separately. Individual steps can be laborious, time consuming, and costly, especially for large lawns. Many of these steps are often done by hand or with different equipment.

In order to maintain good healthy attractive lawn in many areas, it is desirable to mix and plant two or more different type of grass seed. Often a greater amount of one grass seed is used than another. While grass seeds can be spread and distributed by hand, such work is tedious, inefficient and time consuming and often results in large concentration of seeds in one area of the soil and omission of seeds (voids) in other areas of the ground (soil). This often results in unattractive patch-like lawns. Furthermore, too many seeds in one area can cause the grass not to grow and too few seeds can result in bare spots.

Non-power manual spreaders are available, but they are often awkward and inefficient and do not provide for controlled mixing and metering of different types of grass seeds. Furthermore, for large lawns, non-power spreaders can be very tiresome and difficult to use.

Many types of power spreading machines have been suggested, but such conventional power spreading machines are usually bulky, cumbersome and inefficient. Furthermore, conventional power spreading machines do not provide for proportional controlled mixing and accurate metering of different types of grass seeds. Moreover, conventional power spreading machines do not dispense multiple types of grass seeds at different rates nor at adjustable speeds that are faster or slower than the ground speed of the power spreading machine.

Typifying various types of conventional spreading machines, cultivator, and other types of lawn care equipment are those found in U.S. Pat. Nos.: 964,490; 1,099,707; 2,056,337; 2,183,618; 2,206,264; 2,873,807; 2,476,918; 2,966,218; 3,140,677; 3,264,890; 3,414,063; 3,685,468; 3,777,460; 3,878,899; 3,926,131; 4,096,915; 4,167,976; 4,171,021; and 4,524,642. Such prior art spreading machines, cultivators and other types of lawn care equipment have met with varying degrees of success and have not been generally efficient, effective, and reliable for cultivating and properly preparing seed beds.

It is, therefore, desirable to provide an improved cultivating machine and process which overcomes most, if not all, of the preceding problems.

SUMMARY OF THE INVENTION

An improved cultivating machine, lawn care apparatus and process are provided to prepare, condition, cultivate, penetrate, and scratch the soil, turf and lawn in a generally uniform and even manner. Advantageously, the cultivating machine, lawn care apparatus and process are efficient, easy to use and maneuver, and effective.

To this end, the cultivating machine and lawn care apparatus have a plurality, and preferably an eccentric offset array, of rearwardly extending scratching arms or cultivating fingers which are operatively connected to a crankshaft located rearwardly of the cultivating machine's front wheels. The scratching arms penetrate and scratch and cultivate the soil without substantially uprooting, ruining, tearing, or otherwise damaging existing healthy plants and grass and without substantial thatching. The scratching arms are powered by a cultivator power assembly comprising an engine and interconnecting sprockets and chains. Desirably, the scratching arms are uniquely arranged and biased with a spring assembly to effectively accommodate, peaks (mounds), valleys (depressions), and various types of terrains and soil textures. The cultivating machine is also equipped with special controls to regulate and adjust the height of the crankshaft and the depth of penetration of the scratching arms into the soil, lawn, and turf.

The present invention provides a method and apparatus for incorporating grass seed into the soil, thereby getting good seed soil contact. Good seed soil contact is very important to the establishment of a uniform turf because it gives good moisture retention between customer waterings, allowing a more uniform germination rate. The subject cultivator and lawn care apparatus do a better job at getting seed soil contact in existing lawns because they are able to scratch, cultivate, and disturb the soil, lawn, and turf extensively without dislodging healthy existing grass plants, which would otherwise require extensive replanting and expense.

Advantageously, the cultivating and lawn care machine can easily follow and ride upon existing ground, regardless of mounds, valleys, and contour of the ground. Desirably the scratching arms follow the contour of the soil, lawn, and turf and do an excellent job of scratching, cultivating, and softly disturbing the soil, lawn and turf in preparation for the grass seed, in contrast to conventional aerator seeders, slicer seeders, and prior art cultivating machines which typically miss scratching and cultivating concave depressions and numerous other ground areas. Furthermore, the novel cultivating machine is superior over conventional cultivators which often lower their forked tines extra deep to reach down into depressed areas of the ground and uproot, damage, and excessively disturb healthy existing grass plants over the lawn, making the lawn look worse than before.

Advantageously, the novel cultivating and lawn care machine operates smoothly and effectively without causing substantial amounts of thatch (dead root matter). Conventional slicer seeders and other types of prior art lawn care machine often dig up everything in its path along the ground, lawn, or turf and leave mounds (piles) of the disturbed, dug up material on the top surface of the ground. This is due to their continuous rotary motion in one direction. The inventive cultivator and lawn care machine does not do that, because their smooth operating scratching arms work in a reciprocating manner. The thatch and debris at ground level stays there and is just pushed back by the novel cultivator and lawn care machine, thereby exposing a porous area full of nooks and crannies for seed to become lodged in.

Another feature of the cultivator and lawn care machine is that the operator can vary the amount, extent and type of soil disturbance produced by the scratching arms, by raising or lowering the crankshaft. This is especially important because soil texture and conditions vary greatly throughout the country.

In the preferred form, the engine powers the rear wheels in a clockwise rotation (when viewed from the right hand side), while powering the crankshaft in a counterclockwise rotation. As the cultivating and lawn care machine progresses forwardly, the crankshaft reciprocatingly drives the scratching arms into the ground and pushes them rearwardly at a faster rate than the forward progress of the machine. As the crankshaft journal approaches the 1:00 o'clock position, it creates an angle suitable for piercing the point of the scratching arm into the ground. This angle is adjustable for different soil conditions. As the crankshaft progressively rotates from the 1:00 o'clock position, to the 12:00 o'clock position, and then the 11:00 o'clock position, as the machine moves forwardly, the scratching arms begin to push the soil toward the rear of the machine. This pushing action continues until the crankshaft journal reaches the 8:00 o'clock position, when the arm is dragged forwardly at a rate determined by forward motion of the cultivating machine and crankshaft speed. The forward dragging (return) action of the scratching arm continues until the crankshaft reaches the 1:00 o'clock position and the sequence is cyclically repeated.

The scratching arms are preferably spring loaded to follow the contour of the ground. If the front wheels drop into a valley, the scratching arms can change their angle of penetration, due to greater resistance exerted by the ground, and continue to pierce and scratch the soil without tearing up or otherwise ruining the existing lawn. As the cultivating machine and lawn care apparatus pass over the valley, the scratching arms meet a lesser resistance and the scratching arms are spring assisted down into the valley to continue to pierce and scratch the soil down in the valley. This is also true if the valley is in the same direction as the machine travels, because there are many arms individually spring loaded across the width of the cultivating machine.

The crankshaft has a relatively small eccentric action, but revolves relatively fast. This produces a fast reciprocating action which creates the desired scratching, cultivating, penetration, and disturbance without injuring, tearing, uprooting, and dislodging existing grass plants or creating an undesirable thatch layer. The scratching (cultivating) arms can readily form (dig) uniform channels, such as at ¼ inch deep to plant grass seed. At the same time as the crankshaft and scratching arms are doing their job, a special seed dispensing mechanism can be metering out seed and dropping the seed into the freshly disturbed soil.

A more detailed explanation of the invention is provided in the following description and appended claims taken in conjunction with the accompanying drawings.

DETAILED DESCRIPTION OF THE PREFERRED EMBODIMENT

A lawn care, seed spreading, cultivating, and tilling apparatus and machine 10 (FIG. 1) provide a special seed spreader and cultivator which is effective, efficient, and easy to use and maneuver. The seed spreader can reliably store, transport, meter, mix, distribute, and spread different types of grass seeds, such as bluegrass and fescue, or other solid materials, such as fertilizer, uniformly over a lawn regardless of operating speed. The cultivator properly positions, inserts, and incorporates the grass seed or other dispensed material into the soil and attains excellent seed and soil contact by accurately following, scratching and disturbing the contour of the ground soil, turf, or lawn, regardless of mounds, hills, valleys, irregularities, or other contours in the ground soil, turf, or lawn and substantially without thatching and destroying existing plants.

Frame Assembly

Figure 1:
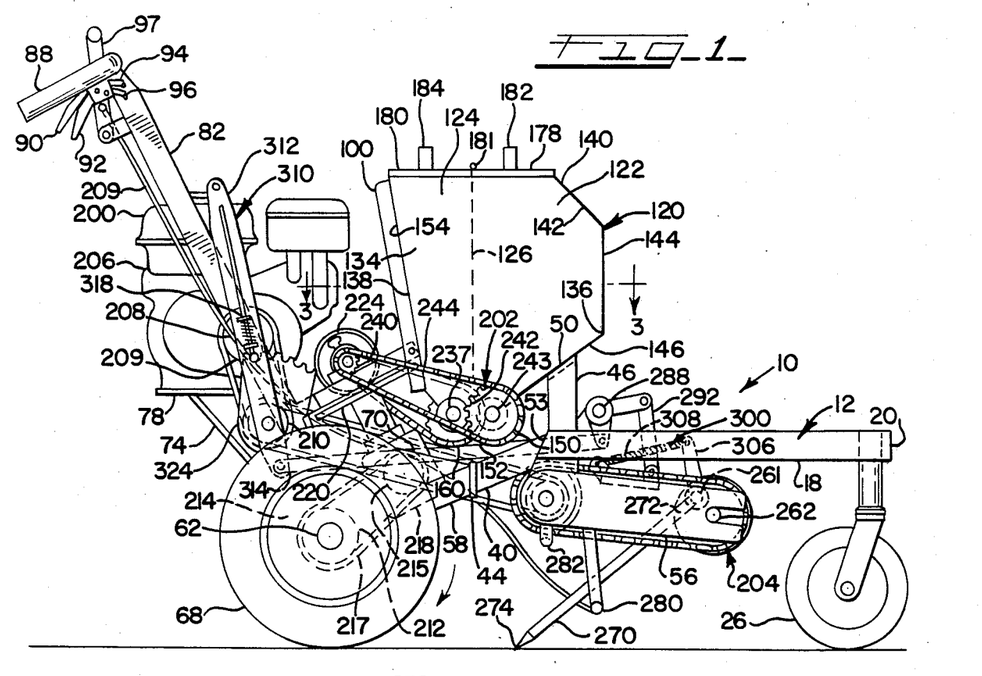
FIG. 1 is a right side view of a cultivator and seed spreader in accordance with principles of the present invention.
Figure 2:
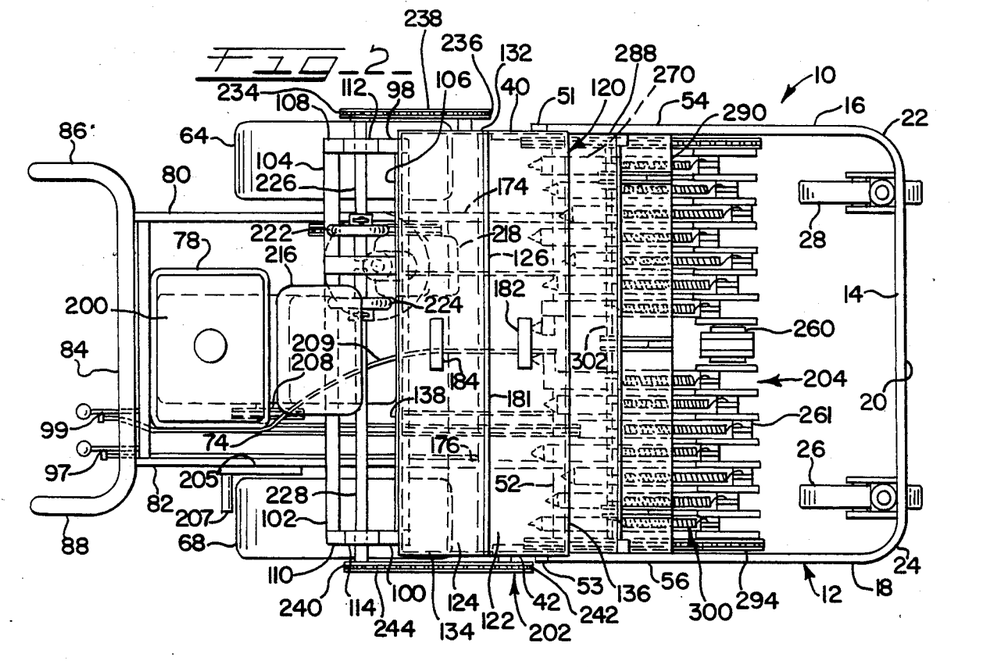
FIG. 2 is a top view of the cultivator and seed spreader.

The lawn care, seed spreading, cultivating, and tilling apparatus and machine 10 has a manually pushable, power driven, metal frame assembly 12 (FIGS. 1 and 2). The frame assembly 12 has a U-shaped front portion 14 with longitudinal side bars 16 and 18 and a front bar 20 extending laterally across and connecting the side bars 16 and 18. The front corners 22 and 24 formed by the intersection of the front bar 20 with the side bars 16 and 18 are rounded. Front caster wheels 26 and 28 extend downwardly from the front bar 20 to provide front tires for the lawn care machine.

The frame assembly 12 (FIGS. 1 and 2) has downwardly inclined longitudinal bars 40 and 42 which extend longitudinally rearwardly and downwardly from the side bars 16 and 18 at an angle of inclination ranging from about 15 degrees to about 60 degrees. The front end of the downwardly inclined longitudinal bars 40 and 42 are welded or otherwise connected to the side bars 16 and 18. A rear compartment transverse bar 44 extends laterally between and is welded or otherwise connected to the rear ends of the downwardly inclined longitudinal bars 40 and 42. Upright front compartment brackets 46 extend vertically upwardly above the rear end of the side bars 16 and 18. The front compartment brackets 46 can be welded to the side bars 16 and 18 or to the downwardly inclined longitudinal bars 40 and 42. The front compartment brackets 46 each have a flange 50 that faces laterally inwardly. The flange 50 slopes upwardly and forwardly at an angle of inclination ranging from about 15 degrees to about 75 degrees. A front compartment transverse bar 52 extends laterally between and can be welded or otherwise connected to the front compartment brackets 46.

Support struts 51 and 53 (FIGS. 1 and 2) extend downwardly and rearwardly from the rearward portion of the side bars 16 and 18. Pivotable crankshaft supporting bars 54 and 56 are pivotally connected to and extend forwardly of the struts 51 and 53. The rearward portions of the crankshaft supporting bars 54 and 56 are pivotally attached to and positioned adjacent the middle portion of the struts 51 and 53 at a location adjacent the downwardly inclined bars 40 and 42. The front end portions of the crankshaft supporting bars 54 and 56 are positioned in proximity to, but rearwardly of, the front caster wheels 26 and 28. The pivotable crankshaft supporting bars 54 and 56 are moveable (pivotable) from a generally horizontal position to raise the crankshaft 260, to a downwardly inclined position, extending downwardly and forwardly at an angle of inclination, to lower the crankshaft 260.

Rear axle supporting bars 58 (FIG. 1) extend rearwardly and downwardly from the rear compartment transverse bar 44 at an angle of inclination ranging from about 15 degrees to about 45 degrees. The rear axle supporting bars 58 laterally span a minimum distance less than the minimum distance between the downwardly inclined longitudinal bars 40 and 42. A rear axle 62 extends laterally between and is supported by the rear axle supporting bars 58. Rear drive wheels 64 and 68 are operatively connected to the rear axle 62. The rear drive wheels 64 and 68 are larger than the front caster wheels 26 and 28 and provide rear tires for the lawn care machine.

The frame assembly 12 (FIG. 1) also has upwardly inclined bars 70 which extending longitudinally rearwardly and upwardly from the rear compartment transverse bar 44 at an angle of inclination ranging from about 15 degrees to about 45 degrees. The upwardly inclined bars 70 are positioned laterally inwardly of the rear axle supporting bars 58. Engine support bars 74 extend longitudinally rearwardly and upwardly from a position rearwardly of portions of the upwardly inclined bars 70 at an angle of inclination ranging from about 120 degrees to about 165 degrees. The front end of the engine support bars 74 can be welded or otherwise connected to the rear end of the upwardly inclined bars 70. A horizontal engine support platform 78 extends laterally across and is mounted to the engine support bars 74.

Elongated rearward bars 80 and 82 (FIGS. 1 and 2) extend upwardly and rearwardly, at an angle of inclination ranging from about 75 degrees to about 135 degrees, from a position adjacent the rear axle supporting bars 58 to an elevation substantially above the height of said engine support platform 78. A handle bar 84 extends laterally across and connects the upper rearward end portions of the elongated rearward bars 80 and 82. The handle bar 84 is positioned at a convenient height, such as at the middle region of an average person's abdomen. Manually grippable handles 86 and 88 extend rearwardly from the ends of the handle bar 84. The handles 86 and 88 permit the operator to readily grasp, push, control, drive, and maneuver the lawn care machine. Levers 90 and 92 (FIG. 1) are provided for steering brakes individually operated for right and left hand turning. Two additional levers 97 and 99 are mounted on the handles to operate the clutch and lift the scratching arms 270.

The frame assembly 12 (FIGS. 1 and 2) further has upright rear compartment brackets 98 and 100 which extend upwardly and rearwardly from the upwardly inclined bars 70 at an angle of inclination ranging from about 105 degrees to about 135. The rear compartment brackets 98 and 100 are substantially longer and taller than the front compartment brackets 46.

Figure 4:
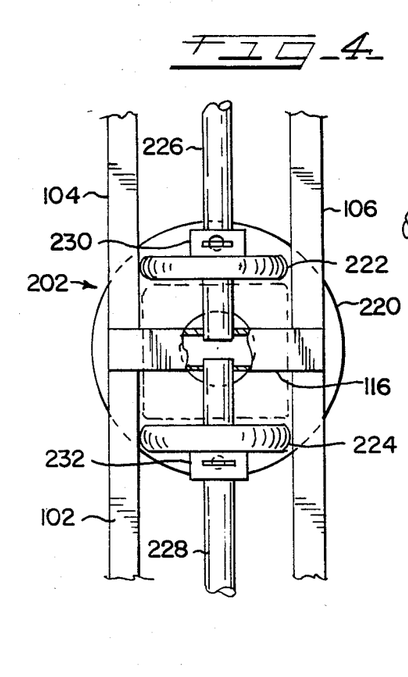
FIG. 4 is a top view of the drive disc and friction wheels taken substantially along lines 4—4 of FIG. 3.

A friction wheel support assembly 102 (FIGS. 1, 4 and 5) is positioned rearwardly of the rear compartment brackets 98 and 100. The friction wheel support assembly 102 has front and rear lateral bars 104 and 106 and bearing supporting side bars 108 and 110 which extend between and connect the ends of the lateral bars 104 and 106. Wheel shaft bearings 112 and 114 are mounted upon the bearing supporting side bars 108 and 110. A central bearing housing member 116 extends longitudinally between and connects the middle portion of the lateral bars 104 and 106. The central bearing member 116 can contain a pair of bearings.

Hopper Assembly

The seed spreader and lawn care machine has a hopper assembly 120 (FIGS. 1-3) mounted upon and abuttingly engaged against the front and rear compartment brackets 46, 98 and 100 and upon the front and rear transverse bars 44 and 52. The hopper assembly 120 has a front compartment, chamber and hopper unit 122 and a rear compartment, chamber and hopper unit 124. The front and rear hopper compartments 122 and 124 extend laterally across the hopper assembly 120 and preferably house and contain different types of grass seed or other solid granular material. A solid upright, intermediate transverse, barrier wall 126 extends laterally across the hopper assembly and separates the front and rear hopper compartments 122 and 124. The barrier wall 126 comprises an imperforate partition and divider which provides the back wall of the front hopper compartment 122 and the front wall of the rear hopper compartment 124. Front and rear seed dispensing lower chambers 128 and 130 are positioned at the bottom of the front and rear hopper compartments 122 and 124, respectively. Vertical side walls 132 and 134 are connected to and extend longitudinally from the lateral ends of the barrier wall 126. The side walls 132 and 134 provide the sides of the front and rear hopper compartments 122 and 124.

The front and rear walls 136 and 138 (FIGS. 1-3) of the hopper assembly 120 provide the front and rear walls, respectively, of the front and rear hopper compartments 122 and 124. The front and rear hopper walls 136 and 138 extend laterally between and connect front and rear portions of the side walls 132 and 134.

The front hopper wall 136 (FIGS. 1-3) has an enlarged convex upper section 140 which is generally trapezoidal shaped as viewed from the sides. The upper section 140 has: (1) a sloping upper portion 142 which extends upwardly and rearwardly from a horizontal axis at an angle of ranging from about 15 degrees to about 75 degrees; (2) an inclined, generally upright, intermediate portion 144 which extends upwardly and forwardly from a vertical axis from about 5 degrees to about 30 degrees; and (3) a sloping lower portion 146 which extends downwardly and rearwardly from the upright intermediate portion 144 at an angle of inclination ranging from about 105 degrees to about 150 degrees. The lower section of the front wall 136 provides the front wall section of the front dispensing chamber 128. The lower front wall section 148 has an upright front wall portion 150 and a slanted lower portion 152. The slanted lower portion 152 extends downwardly and rearwardly from the upright front wall portion 150 at an angle of inclination ranging from about 105 degrees to about 150 degrees.

The inclined rear hopper wall 138 (FIG. 3) has a generally upright elongated, rearward wall portion 154 which extends upwardly and rearwardly from the vertical axis at an angle of inclination ranging from about 5 degrees to about 45 degrees. The lower section 156 of the rear hopper wall 138 provides the rear wall section of the rear dispensing chamber 130. The lower rear wall section 156 has an upright rear wall portion 158 and a slanted lower portion 160 (FIG. 1). The slanted lower portion 160 extends downwardly and forwardly from the upright rear wall portion 158 at an angle of inclination ranging from about 105 degrees to about 150 degrees. The described shapes of the front and rear hopper walls 136 and 138 enhance the dispensing, gravity flow, and metering of the grass seed.

Figure 3:
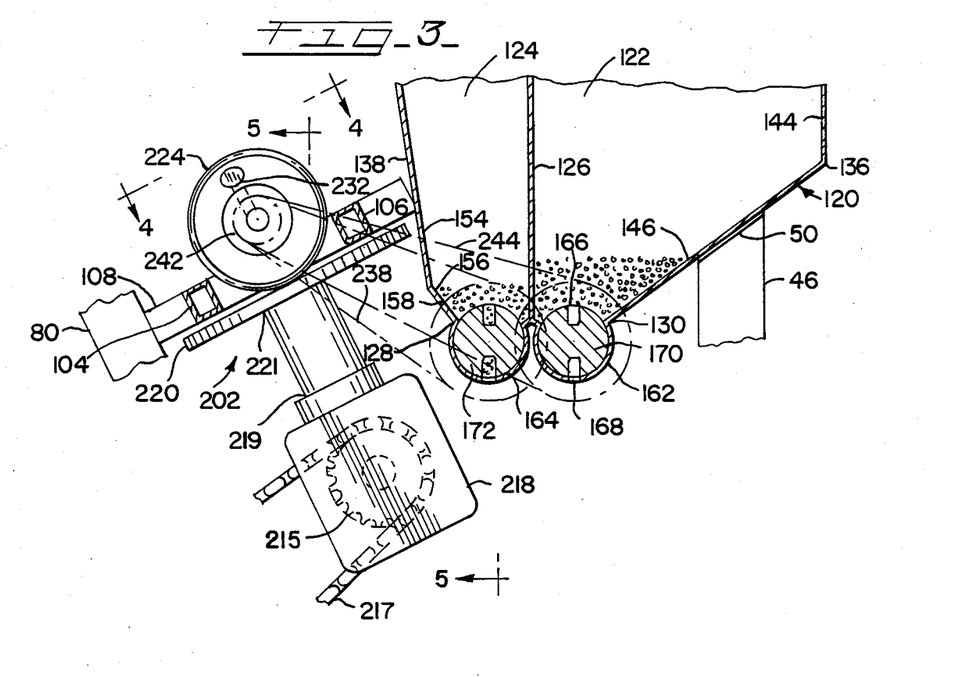
FIG. 3 is an enlarged fragmentary right side view of part of the seed spreader taken substantially along lines 3—3 of FIG. 1 and showing a portion of the hopper compartments and seed tumblers in cross section.

The front and rear seed dispensing chambers 128 and 130 each have perforated, foraminous dispensing tubes 162 and 164 (FIG. 3). The tubes 162 and 164 comprise substantially rigid pipes or tubular shafts and extend laterally across the dispensing chambers 128 and 130, respectively. The tubes 162 and 164 have diametrically opposite inlet and outlet openings, apertures, or holes 166 and 168. Positioned in each of the tubes 162 and 164 are rotatable, seed dispensing tumblers 170 and 172. The seed tumblers 170 and 172 comprise short, plastic cylindrical slugs that have grooves cut across their outer circumference. When the seed tumblers 170 and 172 are rotated (revolve) as described, the seed in the hopper enters the inlet holes of the tubes 162 and 164, fall upon and are held in the grooves of the seed tumblers 170 and 172, and are discharged through the outlet holes of the tubes 162 and 164.

The front and rear hopper compartments 122 and 124 each have two longitudinal imperforate partitions or dividers 174 and 176 (FIG. 2). The partitions or dividers 174 and 176 extend longitudinally between and connect the intermediate transverse barrier wall 126 and the front and rear hopper walls 136 and 138, to divide the upper portion of the compartments into three seed containing chambers. While the illustrated arrangement is preferred for best results, in some circumstances it may be desirably to have more or less dividers and chambers.

The front hopper compartment 122 can have a top front access door 178 (FIG. 1). The rear hopper compartment 124 can have a top rear access door 180. In the illustrated embodiment, the doors 178 and 180 are generally planar or flat, rectangular, and are hinged along a hinge 181 to the top of the intermediate transverse barrier wall 126 so that the doors 178 and 180 open in opposite directions. Alternatively, both doors (covers) can open in the same direction, such as from front to back or vice versa. Each of the doors 178 and 180 has a handle 182 and 184, such as n-shaped handle. Other shaped door handles can be used.

Power Drive Assembly

The lawn care machine has a drive assembly 200 (FIGS. 1 and 2) to propel, power, maneuver, and drive the machine upon the lawn, turf, or soil to be treated. The drive assembly 200 includes a seed spreader drive assembly 202 to power, drive, and rotate the seed tumblers of the seed spreader in order to meter, dispense and distribute the grass seed upon the lawn, turf, or soil. The drive assembly also includes a cultivator drive assembly 204 to power, drive, and rotate the crankshaft and scratching arms of the cultivator in order to scratch, penetrate, cultivate and till the lawn, turf, or soil so as to plant and bury the grass seed. The cultivator drive assembly 204 can have a crankshaft lift lever 205 (FIG. 2) with a handle 207. A clutch engaging lever 97 is connected to the clutch via a control cable 209.

The prime mover of the drive assembly 200 (FIG. 1) is an internal combustion engine 206 mounted on the engine support platform 78. The engine 206 can have an engine drive shaft with an engine drive sprocket 208 positioned in proximity to a cultivator drive sprocket 210. The engine drive sprocket 208 is also sometimes referred to as a rear axle drive sprocket or a seed spreader drive sprocket.

The rear axle 62 has a rear axle sprocket 212. An engine drive chain 214 can connect the engine drive sprocket 208 to the rear axle sprocket 212. When the engine is activated and placed in drive, the rear axle 62 and the rear axle sprocket 212 will be driven and rotate in the forwardly direction via the engine sprocket 208 and engine drive chain 214.

Seed Spreader Drive Assembly

The seed spreader drive assembly 202 can have a drive unit comprising a gear box 216 (FIG. 2) and a disc drive engagement assembly 218. The gear box 216 reduces, or if desired increases, the rear axle rotational speed (rpm). The gear box 216 can comprise a 90 degree gear box or a gear reduction assembly. The drive unit comprising the gear box 216 and the disc drive engagement assembly 218 can be driven by sprockets 214 and 215 (FIG. 1) via a connecting drive chain 217. The disc drive engagement assembly 218 is operatively connected to the gear box 216 and can include a clutch or cam assembly 219 (FIGS. 3 and 5) with a cam 221 or clutch to engage a circular friction drive disc 220 against driven, adjustable friction wheels 222 and 224, upon activation of one or more manually grippable, seed engaging levers or squeezable handles or levers. The drive disc 220 provides a friction drive wheel which is on the output side of the gear box 216. In the preferred embodiment, the drive disc 220 (FIGS. 1 and 3) is positioned at an angle of inclination ranging from about 15 degrees to about 60 degrees and faces generally upwardly and slightly rearwardly. The left and right portion of the upper surface of the drive disc 220 (FIG. 5) contacts, engages, rotates, and drives the left and right friction wheel (drive discs) 222 and 224 in opposite directions.

The left friction wheel 222 (FIG. 5) is connected to a left friction wheel drive shaft 226. The right friction wheel 224 is connected to a right friction wheel drive shaft 228. The friction wheel shafts 226 and 228 are laterally aligned and positioned between the engine 206 and the hopper assembly 120. The friction wheel shafts 226 and 228 are also rotatable mounted upon and connected to bearings 112, 114, and 116. Desirably, each of the friction wheels 222 and 224 has an adjustable connector assembly, such as a thumb screw connector assembly 230 or 232 (FIGS. 4 and 5) to tighten (connect) and loosen (detach) the friction wheels 222 and 224 from the friction wheel shafts 228 and 230 in order to slide the friction wheels 222 and 224 along the friction wheel shafts 228 and 230 to positions closer or farther from the left and right edges of the drive disc 220. The friction wheels 222 and 224 can be moved independently and separately from each other to different asymmetrical positions, or similar symmetrical positions, by means of the adjustable connector assemblies 230 and 232. The closer each friction wheel 222 or 224 is placed to the outer edge of the drive disc 220, the faster that friction wheel will rotate. Conversely, the farther way from the outer edge of the drive disc each friction wheel 222 or 224 is placed, or the closer to the center of the drive disc 220 each friction wheel 222 or 224 is placed, the slower that friction wheel will rotate. By placing the friction wheels 222 and 224 at different distances from the edge of the drive disc 220, the friction wheels 222 and 224 will rotate at different speeds.

In situations when there is only one type of grass seed to be spread, it may be desirable to put the grass in both the front and rear compartments 122 and 124 and place the friction wheel 222 and 224 equidistant and symmetrical relative to the center and outer edge of the drive disc 220 so that the grass seed is meter, dispensed, and spread from the compartments at the same rate and speed. Alternatively, the grass seed can be placed in only the rear hopper compartment 124 or only the front hopper compartment 122, and the friction wheel 222 or 224 associated with the empty hopper compartment can be disengaged and separated from the drive disc 220 by sliding it laterally outwardly and spacing it away from the outer edge of the drive disc 220 in a direction away from the center of the drive disc 220.

The left end of the left friction wheel shaft 228 has a left drive sprocket 234 (FIGS. 1-3). The left drive sprocket 234 rotates, drives and is connected to a left driven sprocket 236 by a left seed tumbler drive chain 238. The left driven sprocket 236 is securely positioned on a hexagonal rear tumbler shaft 237 (FIG. 1) at a location laterally outwardly of the left side wall 132 of the hopper assembly 120 and is operatively connected via the rear tumbler shaft 237 to and rotates the rear seed tumblers 172 in the rear dispensing chamber 130. The right end of the right friction wheel shaft 230 has a right drive sprocket 240. The right drive sprocket 240 rotates, drives and is connected to a right driven sprocket 242 by a right seed tumbler drive chain 244. The right driven sprocket 242 is securely positioned on a hexagonal front tumbler shaft 243 (FIG. 1) at a location laterally outwardly of the right side wall 134 of the hopper assembly 120 and is operatively connected via the front tumbler shaft 243 to and rotates the front seed tumblers 170 in the front dispensing chamber 128.

Figure 5:
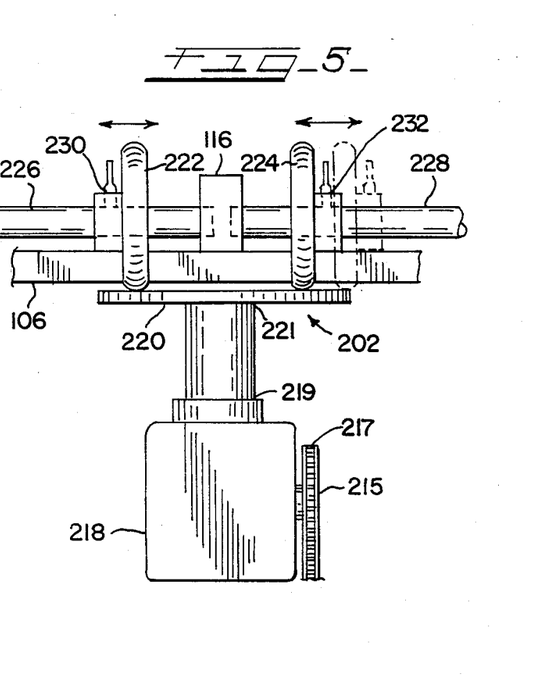
FIG. 5 is a rear view of the drive disc and friction wheels taken substantially along lines 4—4 of FIG. 3.

Clockwise rotation and engagement of the drive disc 220 against the friction wheels 222 and 224, will rotate (drive) the left friction wheel 222, the left friction wheel drive shaft 226, the left drive sprocket 234, the left seed tumbler drive chain 238, the left driven sprocket 236, the rear tumbler shaft 237, and the rear seed tumblers 172 in a clockwise direction; and will simultaneously rotate (drive) the right friction wheel 224, the right friction wheel drive shaft 228, the right drive sprocket 240, the right seed tumbler drive chain 244, the right driven sprocket 242, the front tumbler shaft 243, and the front seed tumblers 170 in a counterclockwise direction. Alternatively, the left drive elements (left friction wheel, left sprockets, etc.) can rotate counterclockwise when the right drive elements (right friction wheel, right sprockets, etc.) can rotate clockwise.

Cultivator Drive Assembly

Figure 6:
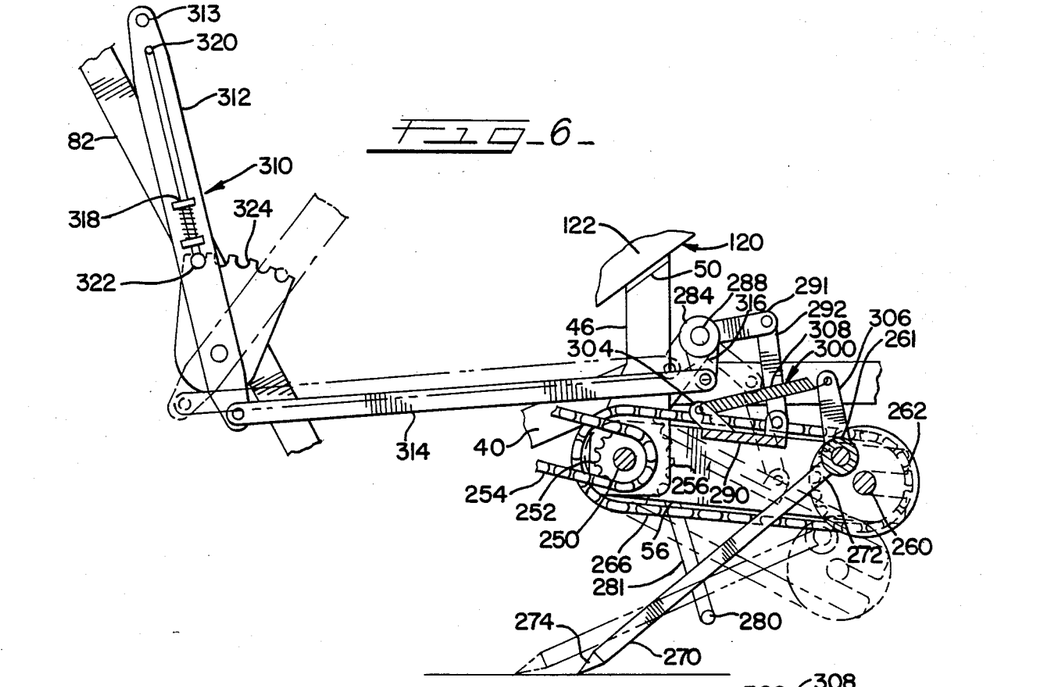
FIG. 6 is a fragmentary right side view of the cultivator.
Figures 7, 8, 9:
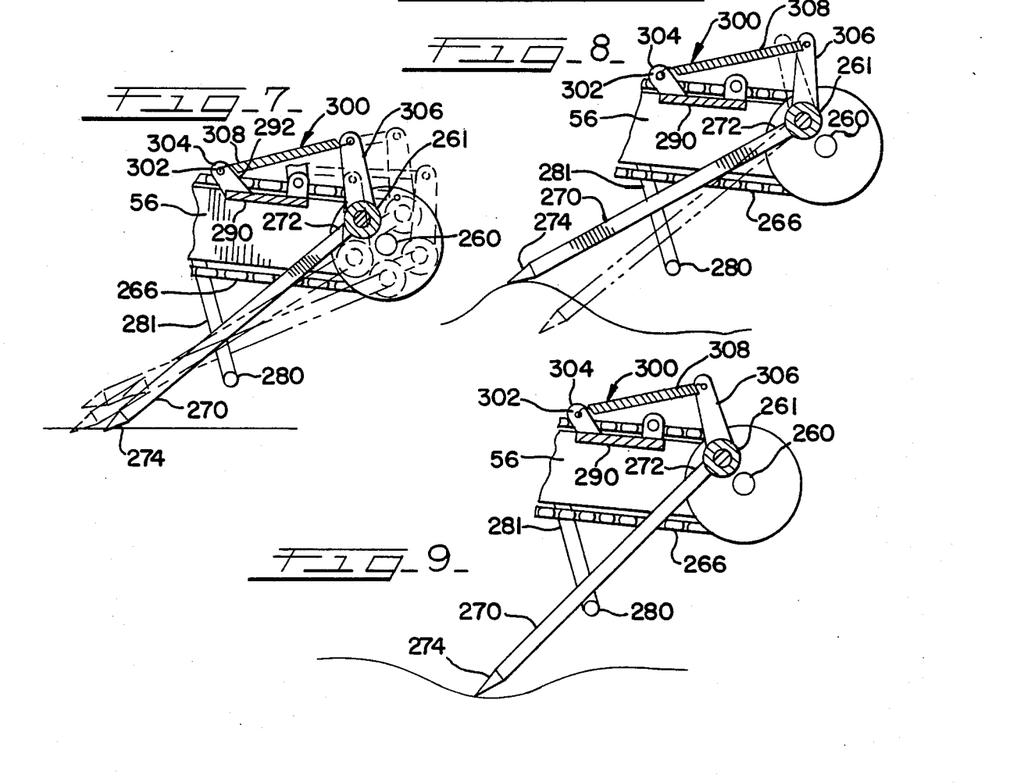
FIG. 7 is a fragmentary side view of the front portion and an arm of the cultivator as it is moving forwardly over generally flat soil.
FIG. 8 is a fragmentary side view of the front portion and an arm of the cultivator as it is moving forwardly over hilly soil.
FIG. 9 is a fragmentary side view of the front portion and an arm of the cultivator as it is moving forwardly over a valley in the soil.

The cultivator drive assembly 204 has a cultivator drive shaft 250 that extends laterally across and is rotatively connected to bearings in the upper rearward portions of the pivotable crankshaft supporting bars 54 and 56 (FIG. 6). A driven cultivator sprocket 252 is connected to a section, such as the right section, of the cultivator drive shaft 250. A cultivator engine drive chain 254 connects the cultivator drive sprocket 210 to the cultivator driven sprocket 252. When the cultivator drive lever 205 is activated, the cultivator drive shaft 250 and cultivator driven sprocket 252 will be driven and rotate in the forwardly direction via the cultivator drive engine sprocket 210 and the cultivator engine drive chain 254. Crankshaft drive sprockets 256 are connected to the left and right ends of the cultivator drive shaft 250.

A crankshaft 260 extends laterally across and is rotatively connected to bearings in the lower front portions of the crankshaft supporting bars 54 and 56 (FIGS. 1 and 6). The crankshaft 260 is positioned laterally between the front wheels 26 and 28 and the hopper assembly 120. The crankshaft has eccentric offset scratching arm-engaging portions 261.

Crankshaft sprockets 262 are connected to the left and right ends of the crankshaft 260. The crankshaft sprockets 262 are driven, rotated, and operatively connected to the crankshaft drive sprockets 256 by crankshaft drive chains 266. The crankshaft sprockets 262 and the crankshaft 260 rotate in the same direction as the crankshaft drive sprockets 256.

Cultivator Arm Assembly

The crankshaft 260 has an eccentric offset array of spring biased cultivating fingers, claws, tines, spikes, feet, or scratching arms 270 (FIGS. 1, 2 and 6–8) to reciprocatingly and sequentially scratch, disturb, and cultivate the soil. The scratching arms 270 (cultivating fingers) are substantially rigid, elongated, and straight. The scratching arms 270 (cultivating fingers) have crankshaft engaging front portions 272 connected to the eccentric portions 261 of the crankshaft 260, and have pointed soil-scratching rearward portions 274 which scratch, engage, penetrate, cultivate, and dig into the soil. Other style points can be used.

A lower transverse, lateral bar 280 (FIGS. 1 and 6–8) is supported by downwardly depending guide brackets 281 and extends below the pivotable crankshaft supporting bars 54 and 56. The lower bar 280 is positioned beneath and extends laterally across the scratching arms 270 (cultivating fingers) at a location between the rearward pointed portions 274 of the scratching arms 270 and the crankshaft 260 to lift the scratching arms 270 during transport. An upper transverse, lateral guide bar 282 (FIG. 1) extends downwardly from the rearward portions of the pivotable crankshaft supporting bars 54 and 56 at a location rearwardly and above said lower guide bar 280. The upper guide bar 280 is positioned below the crankshaft drive chains 266 and above the scratching arms (cultivating fingers) 270 and prevents the scratching arms 270 from bouncing high when hitting rocks.

As shown in FIG. 6, overhead support bars 284 extend above the pivotable crankshaft supporting bars 54 and 56 at a location positioned rearwardly of the crankshaft 260. An overhead transverse shaft or rod 288 extends laterally between and is connected to the overhead support bars 284. A soil impermeable, protective guard plate 290 is positioned above the scratching arms 270 (cultivating fingers) and below the overhead shaft 288. Guard plate linkages 291 and 292 extend between and link the overhead shaft 288 and the guard plate 290. Crankshaft linkages 294 (FIG. 2) extend between and link the overhead shaft 288 and the crankshaft 260.

A spring retention and biasing assembly 300 (FIGS 1, 2 and 6–8) is provided to bias and urge the scratching arms 270 (cultivating fingers) against the soil to accommodate different soil compositions (texture), terrains, hills, mounds, depressions, and other soil contours without uprooting and ruining existing grass plants and without excessively disturbing, plowing, and thatching the lawn, turf, or soil. The spring retention assembly 300 has a transverse, spring retention bar or lateral rod 302 positioned rearwardly and above the guard plate 290. Rigid bar supporting members 304 extend upwardly and rearwardly and connect the guard plate 290 to the spring retention bar 302. The spring retention assembly 300 also has upright spring grasping members 306 connected to and extending vertically above the front portions 272 of the scratching arms 270 (cultivating fingers) at a position vertically above the crankshaft 260. Tension springs 308 extend between and connecting the spring retention bar 302 and the upright spring grasping members 306 to spring bias the scratching arms 270 (cultivating fingers) against the soil.

A crankshaft height adjustment assembly 310 (FIG. 6) is provided to raise and lower the height of the crankshaft 260 to change the depth of soil penetration of the scratching arms (cultivating fingers) 270. The crankshaft height adjustment assembly 310 has a manually operable lever 312 with a handle 313 and lever linkages 314 and 316 which extend between and link the lever 312 to the overhead shaft 288. The lever 312 can have a spring loaded (biased) adjustment rod 318 with an upper manually grippable handle portion 320 and lower ratchet-engaging portion 322 that engages a ratchet 324. When the lever 312 is pushed to a forward position, the linkages 314 and 316 move the overhead shaft 288 forwardly, which pivots the crankshaft supporting bars 54 and 56 to a downwardly inclined position and lowers the crankshaft 260 to decrease the depth of soil penetration of the pointed rearward end portions 274 of the scratching arms (cultivating fingers) 270. When the lever 312 is pulled to a rearward position, the linkages 314 and 316 move the overhead shaft 288 rearwardly, which pivots the crankshaft supporting bars 54 and 56 to a generally horizontal position to raise said crankshaft 260 and increase the depth of soil penetration of the pointed rearward end portions 274 of the scratching arms (cultivating fingers) 270.

Operation of the Seed Spreader

The seed spreading machine (seed spreader) and lawn care apparatus 10 readily transports, accurately meters, effectively mixes, and efficiently disperses (spreads) different types of grass seeds evenly and uniformly over a lawn, turf, or soil. The front and rear hopper units 122 and 124 of the hopper assembly 120 meter and dispense various types of grass seed at different rates (speeds) and in different amounts to plant and maintain healthy attractive lawns. Desirably, the amount, types, proportion, mix, and rates of grass seed can be varied by the lawn specialist to accommodate different soil conditions (compositions, hardness, etc.) and terrain.

The seed spreading machine (seed spreader) and lawn care apparatus 10 provides a means to vary the amount of grass seed to be metered out by easily changing the ratio between ground speed and seed tumbler revolutions. This change of ratio can be readily accomplished by the operator or lawn care specialist commensurate with lawn conditions. When desired, the ground speed of the seed spreading machine can be varied without affecting the uniform application rate of seeds applied.

The seed dispensing assembly 202 typically remains stationary until the seed spreading machine (seed spreader) and lawn care apparatus 10 moves forwardly. The speed at which the seed is metered, dispensed, and expelled from the seed spreading machine (seed spreader) and lawn care apparatus 10 is proportional to the speed of travel of the seed spreading machine and lawn care apparatus 10. The rear axle sprocket 212 on the rear axle 62 or rear wheels 64 and 68, turn the 90 degree gear box 216 which revolves (rotates) the drive disc 220. The drive disc 220 turns freely without contacting the friction wheels 222 and 224 until one or both of the seed engaging levers are activated.

In order to meter, dispense, and spread the grass seeds upon the soil, lawn, or turf, the operator or lawn specialist activates, pulls, depresses, or squeezes one or more of the seed spreader activating levers to engage the clutch or cam assembly 219 so as to move and engage the drive disc 220 upwardly and against the friction wheels 222 and 224. When the seed spreading machine (seed spreader) and lawn care apparatus 10 are so activated, the left and right portion of the upper surface of the drive disc 220 (FIG. 5) contacts, engages, rotates, and drives the left and right friction wheels (driven discs) 222 and 224 in opposite directions.

The friction wheels 222 and 224 can be moved independently and separately from each other to different or similar symmetrical positions, by means of the adjustable connector assemblies 230 and 232. The closer each friction wheel 222 or 224 is placed to the outer edge of the drive disc 220, the faster that friction wheel will rotate. Conversely, the farther way from the outer edge of the drive disc each friction wheel 222 or 224 is placed, or the closer to the center of the drive disc 220 each friction wheel 222 or 224 is placed, the slower that friction wheel will rotate. By placing the friction wheels 222 and 224 at different distance from the edge of the drive disc 220, the friction wheels will rotate at different speeds. By moving the friction wheel 222 or 224 laterally outwardly of the outer edge of the drive disc 220 in a direction away from the middle of the drive disc 220, that friction wheel will disengage and be spaced from the disc drive 220.

The amount of seed can be varied by adjusting the position of the friction wheels 222 and 224 above the drive disc 220. The closer to the center of the drive disc 220 the friction wheels 222 and 224 are placed, the lesser amount of seed is dispensed. Conversely, the further toward the outer diameter, circumference, and edge of the drive disc 220 the friction wheels 222 and 224 are placed, the greater amount of seed is dispensed.

The lawn specialist can evaluate the lawn to be serviced and decide how much of each type of seed is required, such as bluegrass and fescue. The lawn specialist can adjust the friction wheels 222 and 224, placing either or both of them closer to the center of the drive disc 220 if a smaller amount of the particular type of seed is desired, or outwardly towards the peripheral edge of the drive disc 220 if a greater amount of the particular type of seed is needed. Changing the diameter of contact between the slidably adjustable friction wheels 222 and 224 and the drive disc 220, changes the ground speed ratio and turns the seed tumblers either slower or faster, thereby changing the rate of seed application. If only one type of grass seed is to be used; the seed can be placed in both hopper compartments 122 and 124 or alternatively in one compartment and the other friction wheel, associated with the empty hopper compartment, moved outwardly and away from engagement with the drive disc 220.

The forward motion of the seed spreading machine (seed spreader) and lawn care apparatus 10 can be picked up by means of a rear axle sprocket 212 via the engine drive chain 214 and can transmitted to the 90 degree gear box 216. The gear box 216 rotates the drive disc 220 at a speed (rpm) relative to wheels 26, 28, 64, and 68 and the forward ground speed of the seed spreading machine (seed spreader) and lawn care apparatus 10.

Clockwise rotation and engagement of the drive disc 220 against the friction wheels 222 and 224, will rotate (drive) the left friction wheel 222, the left friction wheel drive shaft 226, the left drive sprocket 234, the left seed tumbler drive chain 238, the left driven sprocket 236, the rear tumbler shaft 237, and the rear seed tumblers 172 in a clockwise direction; and will simultaneously rotate (drive) the right friction wheel 224, the right friction wheel drive shaft 228, the right drive sprocket 240, the right seed tumbler drive chain 244, the right driven sprocket 242, the front tumbler shaft 243, and the front seed tumblers 170 in a counterclockwise direction.

The left drive sprocket 234 rotates and drives the left driven sprocket 236 via the left seed tumbler drive chain 238. The left drive sprocket 236 rotates the seed tumblers in the rear dispensing chamber 130. Concurrently, the right drive sprocket 240 rotates and drives the right driven sprocket 242 via the right seed tumbler drive chain 244. The right driven sprocket 242 rotates the seed tumblers in the front dispensing chamber 128.

When the seed tumblers 170 and 172 are rotated (revolve) as described above, the seeds in the hopper units 122 and 124 enter the inlet holes 166 of the tubes 162 and 164, fall upon and are held in the grooves of the seed tumblers 170 and 172, and are discharged through the outlet holes 168 (exit ports) of the tubes 162 and 164 upon the lawn, turf, or soil.

In use, the seed spreading machine (seed spreader) and lawn care apparatus 10 can simultaneously transport one type of grass seeds in the front hopper compartment 122 while transporting another type of grass seeds in the rear hopper compartment 124. The grass seed in the front hopper compartment 122 can be metered, dispensed, and spread in a clockwise direction at one speed and flow rate upon the soil (ground), lawn or turf beneath the seed spreading machine (seed spreader) and lawn care apparatus 10; concurrently, the grass seed in the rear hopper compartment 124 can be metered, dispensed, and spread in a counterclockwise direction at another speed and flow rate upon the soil (ground), lawn or turf beneath the seed spreading machine (seed spreader) and lawn care apparatus 10. Advantageously, in order to accommodate different soil compositions, textures, and growing conditions, the grass seed in one of the compartments can be metered, dispensed, and spread at a greater quantity (amount) and rate than the grass seed in the other compartment. The grass seed in one or both of the hopper compartments 122 and 124 can also be metered, dispersed, and spread at a different speed than the ground speed of the seed spreading machine (seed spreader) and lawn care apparatus 10.

Operation of the Cultivator

The cultivating machine (cultivator) and lawn care apparatus 10 prepares, conditions, cultivates, tills, rakes, penetrates, and scratches the soil, turf and lawn in a generally uniform and even manner. When activated, the scratching arms 270 (cultivating fingers) sharply penetrate, gently disturb, smoothly scratch, and efficiently cultivate the soil without uprooting, ruining, or damaging existing healthy plants and grass and without substantial thatching. The cultivating machine (cultivator) and lawn care apparatus 10 properly positions, inserts, and buries the grass seed or other dispensed material from the seed spreader into the soil and attains excellent seed and soil contact for virtually all soil compositions, textures, and conditions by accurately following, scratching and disturbing the contour of the ground soil, turf, or lawn, regardless of mounds, hills, valleys, irregularities, or other contours in the ground soil, turf, or lawn.

The cultivator 10 can be activated by engaging the cultivator drive lever. When activated, the cultivator drive shaft 250 and cultivator driven sprocket 252 will be driven and rotate via the cultivator drive engine sprocket 210 and the cultivator engine drive chain 254, and the crankshaft 260 will be driven and rotated by the crankshaft drive sprockets 256 via the crankshaft drive chains 266 and the crankshaft sprockets 262. The crankshaft 260 rotates in an opposite direction of the rear axle 62 and wheels 64 and 68. The scratching arms 270 (cultivating fingers) sequentially, cyclically, and progressively reciprocate, intermittently slide and consecutively move rearwardly and forwardly so that its pointed rearward end portions 274 enter the soil in a rearwardly direction (FIGS. 1 and 6–8) at an angle of inclination ranging from about 15 degrees to about 75 degrees relative the vertical axis, as the cultivating machine (cultivator) and lawn care apparatus 10 move forwardly along the ground.

The pointed rearward end portions 274 of the scratching arms 270 (cultivating fingers) are urged against the soil by the springs 308 of the spring retention and biasing assembly 300. The spring biased scratching arms 270 (cultivating fingers) effectively accommodate, peaks (mounds), valleys (depressions), and other contours of the ground soil, as well as accommodate different soil hardness (softness) and soil makeup (composition, texture, etc.). The angle of inclination of the scratching arms 270 (cultivating fingers) can be set for a normal angle of penetration from the vertical axis, for flat ground but vary according to the contour, lumps, and roughness of the soil. The normal angle of penetration of the scratching arms 270 (cultivating fingers) can be adjusted, along with the height of the crankshaft 260 and the height of the scratching arms 270 (cultivating fingers), with the crankshaft height adjustment assembly 310. When the height adjustment lever 312 is moved forwardly, the crankshaft 260 and scratching arms 270 (cultivating fingers) are lowered and the angle of penetration is reduced. In lowered crankshaft position, the overhead shaft 288 is moved forwardly by the linkages 314 and 316, and the crankshaft supporting bars 54 and 56 are pivoted to a downwardly inclined position. When the height adjustment lever 312 is moved rearwardly, the crankshaft 260 and scratching arms 270 (cultivating fingers) are raised and the angle of penetration is increased. In the raised crankshaft position, the overhead shaft 288 is moved rearwardly by the linkages 314 and 316, and the crankshaft supporting bars 54 and 56 are pivoted to a generally horizontal position.

The cultivating machine (cultivator) and lawn care apparatus 10 can easily follow and ride upon existing ground, regardless of mounds, valleys, and contour of the ground. If the front wheels 26 and 28 drop into a valley, the scratching arms 270 can change their angle of penetration, due to greater resistance exerted by the ground, and continue to pierce and scratch the soil without ruining (tearing up) the existing lawn. As the cultivating machine (cultivator) and lawn care apparatus 10 pass over the valley, the scratching arms 270 meet a lesser resistance and the scratching arms 270 are spring assisted down into the valley and continue to pierce and scratch the soil down in the valley. This also occurs if the valley is in the same direction as the machine 10 travels, because there are many scratching arms 270 individually spring loaded across the width of the cultivating machine (cultivator) and lawn care apparatus 10.

The cultivating machine (cultivator) and lawn care apparatus 10 provides good seed soil contact and helps establish an attractive uniform lawn and turf. Attainment of good seed soil contact helps provide good moisture retention between watering and a more uniform germination rate. Furthermore, thatch and debris at ground level stay there and are pushed back in the grass roots area by the cultivating machine (cultivator) and lawn care apparatus 10, rather than on top of the grass and plants, thereby exposing a porous ground (soil) area full of nooks and crannies for grass seed to become lodged. Desirably, the cultivating machine (cultivator) and lawn care apparatus 10 can loosen root systems of grass plants without removing, tearing out, uprooting, poking holes, or adversely displacing the grass plants.

In the preferred embodiment, the engine 206 powers the rear wheels 64 and 68 in a clockwise rotation (when viewed from the right hand side), while powering the crankshaft 260 in a counterclockwise rotation. As the cultivating machine (cultivator) and lawn care apparatus 10 progress forwardly, the crankshaft 260 reciprocatingly drives the scratching arms 270 (cultivating fingers) into the ground and pushes them rearwardly at a faster rate than the forward progress of the machine 10 along the ground. As an eccentric scratching arm-connecting portion (journal) 261 of the crankshaft 260 approaches the 1:00 o'clock position, it creates an angle suitable for piercing the point 274 of its associated scratching arm 270 into the ground. As the eccentric scratching arm-connecting portion 261 of the crankshaft 260 progressively rotates from 1:00 o'clock to the 12:00 o'clock and then the 11:00 o'clock positions, as the cultivating machine (cultivator) and lawn care apparatus 10 moves forwardly, its associated scratching arm 270 begins to scratch and push the soil toward the rear of the machine 10. This scratching and pushing action continues until the eccentric scratching arm-connecting portion 261 of the crankshaft 260 reaches the 9:00 o'clock position, when its associated scratching arm 270 is dragged forwardly (retracted) at a rate determined by forward motion of the cultivating machine (cultivator) and lawn care apparatus 10 and the rotational speed of the crankshaft 260. The cycle repeats again when the eccentric scratching arm-connecting portion 261 of the crankshaft 260 reaches the 1:00 o'clock position.

The scratching arms 270 (cultivating fingers) can readily scratch, form, till, and dig uniform scratches and channels, such as at ¼ inch deep, to plant grass seed. Simultaneously, the above seed dispensing mechanism is metering out grass seed and dispersing (dropping) the grass seed into the freshly disturbed soil.

One of the many reasons the cultivating machine (cultivator) and lawn care apparatus 10 works as well as it does is because of the reciprocating action of the scratching arms 270 (cultivating fingers) that can jab their points 274 down into the ground at approximately a 45 degree angle and then continue to push their points 274 while lowering the angle to approximately 30 degrees. This causes the points 274 to get a good bite into the ground no matter how hard, compact, and dense the ground may be and then plows the points 274 under and parallel to the ground in a manner similar to a mole. This breaks the ground up into marble size chunks, making an ideal seed bed.

The reciprocating action of the scratching arms 270 (cultivating fingers) doesn't tear everything out of the ground that is in its path, nor does it dislodge roots and deposit thatch and debris up on top of the lawn as in prior art cultivators and tilling equipment, but instead just disturbs the grass plants a little by boring through their roots and pushing the thatch out of the way. Preferably, the reciprocating action of the scratching arms 270 (cultivating fingers) is short in total travel and very quick, making disturbance frequent and advantageously scratching the soil in the opposite direction (rearwardly) to the forward travel of the cultivating machine (cultivator) and lawn care apparatus 10. This allows for a fresh new bite into the soil, avoids tearing of grass plants and roots, and provides a self-cleaning action that prevents buildup of thatch and root matter.

Among the many advantages of the novel cultivating machine (cultivator), lawn care apparatus, and process are:

1. Smoothly scratches, gently disturbs, sharply penetrates, and expertly cultivates the soil, lawn, and turf, without uprooting, ruining, or damaging existing healthy grass plants.
2. Prepares, conditions, tills, and scratches the soil, turf and lawn in a generally uniform and even manner.
3. Properly positions, inserts, and buries the grass seed or other dispensed material from the seed spreader into the soil.
4. Attains excellent seed and soil contact for virtually all soil compositions, textures, and conditions.
5. Accurately follows the contour of the ground soil, turf, or lawn, regardless of mounds, hills, valleys, irregularities, or other contours in the ground soil, turf, or lawn.
6. Accommodates different soil hardness (softness), conditions, and makeup (compositions).
7. Readily permits adjustment of the height of the crankshaft and scratching arms (cultivating fingers) as well as permits adjustment of the angle and depth of soil penetration for different soil conditions.
8. Minimizes thatching, as well as saves and avoids time, expense, and labor in collecting thatch.
9. Simultaneously, allows the seed spreader to meter out, disperse, and spread grass seed onto the freshly cultivated soil.
10. Establishes an attractive lawn and turf.
11. Superior lawn care preparation and maintenance.
12. Outstanding performance.
13. Smooth operation.
14. Excellent load-carrying capacity.
15. Good structural strength and integrity.
16. Easy to maneuver.
17. Simple to use.
18. Convenient.
19. Economical.
20. Dependable.
21. Efficient.
22. Effective.

Although embodiments of the invention have been shown and described, it is to be understood that various modifications and substitutions, as well as rearrangements of parts and process steps, can be made by those skilled in the art without departing from the novel spirit and scope of this invention.

What is claimed is:

1. A lawn care and cultivating machine, comprising:
a power driven frame assembly with front wheels and rear wheels, said power driven frame assembly having pivotable crankshaft supporting bars positioned between said front and rear wheels and an engine support platform positioned rearwardly of said crankshaft support bars, said crankshaft supporting bars having front portions and rearward portions;
a set of spring biased cultivating fingers for reciprocating and sequentially cultivating soil, said fingers having crankshaft engaging front portions and pointed rearward portions;
a cultivator drive assembly having a crankshaft extending laterally between and rotatively connected to said front portions of said crankshaft supporting bars, said crankshaft having eccentric portions connected to said front portions of said cultivating fingers, driven crankshaft sprockets connected to said crankshaft, a cultivator drive shaft extending laterally between and rotatively connected to said rearward portions of said crankshaft supporting bars, crankshaft drive sprockets connected to said drive shaft, crankshaft drive chains operatively connecting said crankshaft drive sprockets and said driven crankshaft sprockets, an engine driven sprocket connected to said drive shaft and positioned between said crankshaft drive sprockets, an engine mounted on said engine support platform and located generally above said rear wheels, an engine drive sprocket operatively connected to said engine, and an engine drive chain operatively connecting said engine drive sprocket and said engine driven sprocket;
said crankshaft supporting bars being pivotable about said cultivator drive shaft from a substantially horizontal position to raise said crankshaft to a downwardly inclined forwardly position to lower said crankshaft;
and a seed spreader assembly positioned rearwardly of said crankshaft; said seed spreader comprising
bin means having a front compartment, a rear compartment, and a partition separating said front compartment from said rear compartment;
front metering means operatively associated with said front compartment for metering substantially solid material, such as grass seed, from said first compartment; and
rear metering means operatively associated with said rear compartment for metering another substantially solid material, such as another type of grass seed, from said rear compartment;
one of said metering means operating at a faster metering rate than the other metering means for metering the material associated with said faster metering means at a faster rate than the material associated with said slower metering means; and
at least one of said metering means revolving at a different rate than said rear wheels.

2. A lawn care and cultivating machine, comprising:
a crankshaft;
cultivating fingers extending rearwardly from said crankshaft for scratching the surface of soil;
power driven chain and sprocket means for rotating said crankshaft; and
a guard plate positioned above a portion of said cultivating fingers;
a transverse spring retention bar positioned rearwardly and above said guard plate;
bar supporting members connecting said spring retention bar to said guard plate;
upright spring grasping members connected to and extending substantially vertically above said front portions of said cultivating fingers at a position substantially vertically above said crankshaft; and tension springs extending between and connecting said spring retention bar and said upright spring grasping members.

3. A lawn care and cultivating machine in accordance with claim 2 including a transverse guide bar positioned below and engaging said cultivating fingers.

4. A lawn care and cultivating machine in accordance with claim 2 including:
   a seed spreader assembly positioned rearwardly of said crankshaft; said seed spreader comprising
   bin means having a front compartment, a rear compartment, and a partition separating said front compartment from said rear compartment;
   front metering means operatively associated with said front compartment for metering substantially solid material, such as grass seed, from said first compartment; and
   rear metering means operatively associated with said rear compartment for metering another substantially solid material, such as another type of grass seed, from said rear compartment.

5. A lawn care and cultivating machine, comprising:
   a power driven frame assembly with front wheels and rear wheels, said power driven frame assembly having pivotable crankshaft supporting bars positioned between said front and rear wheels and an engine support platform positioned rearwardly of said crankshaft support bars, said crankshaft supporting bars having front portions and rearward portions;
   a set of spring biased cultivating fingers for reciprocating and sequentially cultivating soil, said fingers having crankshaft engaging front portions and pointed rearward portions;
   a cultivator drive assembly having a crankshaft extending laterally between and rotatively connected to said front portions of said crankshaft supporting bars, said crankshaft having eccentric portions connected to said front portions of said cultivating fingers, driven crankshaft sprockets connected to said crankshaft, a cultivator drive shaft extending laterally between and rotatively connected to said rearward portions of said crankshaft supporting bars, crankshaft drive sprockets connected to said drive shaft, crankshaft drive chains operatively connecting said crankshaft drive sprockets and said driven crankshaft sprockets, an engine driven sprocket connected to said drive shaft and positioned between said crankshaft drive sprockets, an engine mounted on said engine support platform, a engine drive sprocket operatively connected to said engine, and an engine drive chain operatively connecting said engine drive sprocket and said engine driven sprocket;
   said crankshaft supporting bars being pivotable about said cultivator drive shaft from a substantially horizontal position to raise said crankshaft to a downwardly inclined forwardly position to lower said crankshaft;
   overhead support bars extending above said crankshaft supporting bars at a location rearwardly of said crankshaft;
   an overhead shaft extending laterally between and connected to said overhead support bars;
   a guard plate positioned above said cultivating fingers and below said overhead shaft;
   guard plate linkages extending between and linking said overhead shaft and said guard plate;
   crankshaft linkages extending between and linking said overhead shaft and said crankshaft;
   a transverse spring retention bar positioned rearwardly and above said guard plate;
   bar supporting members connecting said spring retention bar to said guard plate;
   upright spring grasping members connected to and extending substantially vertically above said front portions of said cultivating fingers at a position substantially vertically above said crankshaft; and
   tension springs extending between and connecting said spring retention bar and said upright spring grasping members.

6. A lawn care and cultivating machine in accordance with claim 5 wherein:
   said cultivating fingers are substantially rigid, elongated, and straight; and
   said frame assembly includes a lower transverse guide bar extending below said crankshaft supporting bars, said lower guide bar is positioned beneath and extends laterally across said cultivating fingers at a location between said pointed portions and said crankshaft for lifting said cultivating fingers.

7. A lawn care and cultivating machine in accordance with claim 6 wherein said frame assembly includes an upper transverse guide bar extending downwardly from said rearward portions of said crankshaft supporting bars at a location rearwardly and above said lower guide bar, and said upper guide bar is positioned below said crankshaft drive chain and above said cultivating fingers.

8. A lawn care and cultivating machine in accordance with claim 5 including a manually operable lever and lever linkages extending between and linking said lever to said overhead shaft for raising and lowering said crankshaft to change the depth of soil penetration of said cultivating fingers, said lever being pushable to a forward position for moving said overhead shaft forwardly and pivoting said crankshaft supporting bars to said downwardly inclined position to lower said crankshaft, and said lever being pullable to a rearward position for moving said overhead shaft rearwardly and pivoting said crankshaft supporting bars to said generally horizontal position to raise said crankshaft.

9. A lawn care and cultivating machine, comprising:
   a power driven frame assembly with front wheels and rear wheels, said power driven frame assembly having pivotable crankshaft supporting bars positioned between said front and rear wheels and an engine support platform positioned rearwardly of said crankshaft support bars, said crankshaft supporting bars having front portions and rearward portions;
   a set of spring biased cultivating fingers for reciprocating and sequentially cultivating soil, said fingers having crankshaft engaging front portions and pointed rearward portions;
   a cultivator drive assembly having a crankshaft extending laterally between and rotatively connected to said front portions of said crankshaft supporting bars, said crankshaft having eccentric portions connected to said front portions of said cultivating fingers, driven crankshaft sprockets connected to said crankshaft, a cultivator drive shaft extending laterally between and rotatively connected to said rearward portions of said crankshaft supporting bars, crankshaft drive sprockets connected to said drive shaft, crankshaft drive chains operatively connecting said crankshaft drive sprockets and said driven crankshaft sprockets, an engine driven sprocket connected to said drive shaft and positioned between said crankshaft drive sprockets, an engine mounted on said engine support platform, a engine drive sprocket operatively connected to said engine, and an engine drive chain operatively connecting said engine drive sprocket and said engine driven sprocket;

said crankshaft supporting bars being pivotable about said cultivator drive shaft from a substantially horizontal position to raise said crnakshaft to a downwardly inclined forwardly position to lower said crankshaft; and a seed spreader assembly positioned rearwardly of said crankshaft; said seed spreader assembly comprising bin means having a front compartment, a rear compartment, and a partition separating said front compartment from said rear compartment;

front metering means operatively associated with said front compartment for metering substantially solid material, such as grass seed, from said first compartment; and rear metering means operatively associated with said rear compartment for metering another substantially solid material, such as another type of grass seed, from said rear compartment;

one of said metering means operating at a faster metering rate than the other metering means for metering the material associated with said faster metering means at a faster rate than the material associated with said slower metering means: and at least one of said metering means revolving at a different rate than said rear wheels.

10. A lawn care and cultivating machine, comprising:
a manually pushable, power driven frame assembly having longitudinal side bars, a front bar extending laterally across said side bars, support struts extending downwardly and rearwardly from said side bars, pivotable crankshaft supporting bars pivotally connected to and extending forwardly from said struts, said crankshaft supporting bars having crankshaft supporting front portions and pivotable rearward portions, downwardly inclined bars extending rearwardly from said side bars, a transverse bar extending laterally between and connecting said downwardly inclined bars, rear axle supporting bars extending rearwardly and downwardly from said transverse bar, said rear axle supporting bars spanning a lateral distance less that the lateral distance between said downwardly inclined bars, upwardly inclined bars extending rearwardly from said transverse bar, said upwardly inclined bars positioned laterally inwardly and above said rear axle supporting bars, engine support bars extending rearwardly at an upward angle of inclination from said upwardly inclined bars, an engine support platform extending across said engine support bars, elongated rearward bars extending upwardly and rearwardly at an angle of inclination from said upwardly inclined bars to an elevation substantially above the height of said engine support platform, a handle bar extending across an upper portion of said elongated rearward bars, front compartment brackets extending substantially vertically upwardly from said side bars, and rear compartment brackets extending upwardly and rearwardly at an angle of inclination from said upwardly inclined bars to a height substantially above said front compartment brackets;

a hopper assembly extending substantially across said frame assembly above said transverse bar, said hopper assembly having side walls, a front compartment for containing one type of grass seed, a rear compartment for containing another type of grass seed, and an upright barrier wall providing a substantially imperforate partition extending laterally across said hopper assembly and separating said front and rear compartments, said front compartment having a lower front dispensing chamber and a front wall, said front wall comprising a rearwardly sloping upper portion, an inclined intermediate portion, and a rearwardly sloping lower portion mounted upon said front compartment brackets, said rear compartment having a lower rear dispensing chamber positioned rearwardly of said front dispensing chamber and a rearward wall abuttingly engaging and mounted against said rear compartment bracket, said front and rear walls extending laterally between and connecting said side walls, a front dispensing tube defining front inlet and outlet openings and containing rotatable front tumblers extending generally across said front dispensing chamber for dispensing seeds from said front compartment, a rear dispensing tube defining rear inlet and outlet openings and containing rotatable rear tumblers extending generally across said rear dispensing chamber for dispensing seeds from said rear compartment;

a set of spring biased cultivating fingers positioned between front castor wheels and rear drive wheels for reciprocating and sequentially cultivating soil, said fingers having crankshaft engaging front portions and pointed rearward portions, said cultivating fingers being substantially rigid, elongated, and straight;

a drive assembly comprising an internal combustion engine mounted on said engine support platform, said front caster wheels extending downwardly at a location in proximity to said front bar, a rear axle extending laterally between and supported by said rear axle supporting bars, said rear drive wheels operatively connected to said rear axle, a seed spreader drive assembly operatively connected to said engine, and a cultivator drive assembly operatively associated with said seed spreader drive assembly;

said seed spreader drive assembly comprising a gear reduction assembly operatively connected to said drive sprocket, a drive disc operatively connected to and positioned forwardly of said gear reduction assembly, a front compartment drive shaft drive shaft extending laterally between said engine and said hopper assembly, a front compartment drive sprocket connected adjacent an end of said front compartment drive shaft, an adjustable front compartment friction wheel slidably connected to said front compartment drive shaft, said adjustable front compartment friction wheel positioned above and driven by said drive disc in one direction, a rear compartment drive shaft positioned in substantial lateral alignment with said front compartment drive shaft, a rear compartment drive sprocket connected adjacent an end of said rear compartment drive shaft, an adjustable rear compartment friction wheel slidably connected to said rear compartment drive shaft, said rear compartment friction wheel positioned above and driven by said drive disc in an opposite direction of said front compartment friction wheel, a front compartment driven sprocket operatively to said front tumblers, a rear compartment driven sprocket operatively connected to said rear tumblers, a front compartment chain operatively connecting said front compartment drive sprocket and said front compartment driven sprocket, and a rear compartment chain connecting said rear compartment drive sprocket and said rear compartment driven sprocket, one of said friction wheels and said tumblers rotating clockwise for dispensing seeds in a clockwise direction and the other of said friction wheels and said tumblers rotating counterclockwise for dispensing seeds in a counterclockwise direction;

said cultivator drive assembly comprising a crankshaft positioned between said front wheels and said hopper assembly, said crankshaft extending laterally between and rotatively connected to said front portions of said crankshaft supporting bars, said crankshaft having eccentric portions connected to said front portions of said cultivating fingers, driven crankshaft sprockets connected to said crankshaft, a cultivator drive shaft extending laterally between and rotatively connected to said rearward portions of said crankshaft supporting bars, crankshaft drive sprockets connected to said drive shaft, crankshaft drive chains operatively connecting said crankshaft drive sprockets and said driven crankshaft sprockets, an engine driven sprocket connected to said drive shaft and positioned between said crankshaft drive sprockets, an engine drive sprocket operatively connected to said engine, and an engine drive chain operatively connecting said engine drive sprocket and said engine driven sprocket, said crankshaft supporting bars being pivotable about said cultivator drive shaft from a generally horizontal position to raise said crankshaft to a downwardly inclined forwardly position to lower said crankshaft;

an assembly comprising overhead support bars extending above said crankshaft supporting bars at a location rearwardly of said crankshaft, an overhead shaft extending laterally between and connected to said overhead support bars, a guard plate positioned above said cultivating fingers and below said overhead shaft, guard plate linkages extending between and linking said overhead shaft and said guard plate, and crankshaft linkages extending between and linking said overhead shaft and said crankshaft;

a biasing assembly comprising a transverse spring retention bar positioned rearwardly and above said guard plate, bar supporting members connecting said spring retention bar to said guard plate, upright spring grasping members connected to and extending substantially vertically above said front portions of said cultivating fingers at a position substantially vertically above said crankshaft, and tension springs extending between and connecting said spring retention bar and said upright spring grasping members; and an adjustment assembly comprising a manually operable lever and lever linkages extending between and linking said lever to said overhead shaft for raising and lowering said crankshaft to change the depth of soil penetration of said cultivating fingers, said lever being pushable to a forward position for moving said overhead shaft forwardly and pivoting said crankshaft supporting bars to said downwardly inclined position to lower said crankshaft, and said lever being pullable to a rearward position for moving said overhead shaft rearwardly and pivoting said crankshaft supporting bars to said generally horizontal position to raise said crankshaft.

11. A lawn care and cultivating machine in accordance with claim 10 wherein: said front and rear compartments of said hopper assembly each comprise a plurality of chambers; at least one of said friction wheels rotates at a different speed than said rear drive wheels; and said rear drive wheels and said crankshaft rotate in opposite directions.

12. A lawn care and cultivating process, comprising the steps of:
    moving a lawn care and cultivating machine in a forwardly direction along the ground to be prepared and conditioned preparatory to the ground receiving grass seeds;
    powering rear wheels of said machine in a clockwise direction while powering a crankshaft of said machine in a counterclockwise direction;
    following the contour of said ground with said lawn care and cultivating machine regardless of mounds, hills, and valleys; while simultaneously
    scratching the soil comprising said ground in a rearwardly direction at a substantially downwardly angle of inclination with cultivating fingers without substantially uprooting and damaging plants and grass on said ground;
    pushing said cultivating arms rearwardly at a faster rate than the forward progress of the machine along the ground;
    jabbing points of said cultivating arms into the ground at about a 45 degree angle and continuing to push said points into the ground while lowering the angle of inclination of said points into the ground to about 30 degrees to break up the ground so as to help form a seed bed; and concurrently metering seed on said seed bed.

* * * * *